(12) United States Patent
Vauchel et al.

(10) Patent No.: US 8,739,552 B2
(45) Date of Patent: *Jun. 3, 2014

(54) STRUCTURAL NACELLE

(75) Inventors: Guy Bernard Vauchel, Le Havre (FR);
Anne-Laure Gibouin, F-Toulouse (FR);
Regis Fassier, Lapeyrouse Fossat (FR);
Jean-Philippe Joret, Beuzeville (FR);
Jerome Collier, Le Havre (FR);
Guillaume Lefort, Paris (FR);
Pierre-Alain Chouard, Paris (FR)

(73) Assignee: Aircelle, Gonfreville l'Orcher (FR)

( * ) Notice: Subject to any disclaimer, the term of this patent is extended or adjusted under 35 U.S.C. 154(b) by 984 days.

This patent is subject to a terminal disclaimer.

(21) Appl. No.: 12/302,998

(22) PCT Filed: Jun. 11, 2007

(86) PCT No.: PCT/FR2007/000951
§ 371 (c)(1),
(2), (4) Date: Dec. 1, 2008

(87) PCT Pub. No.: WO2008/000924
PCT Pub. Date: Jan. 3, 2008

(65) Prior Publication Data
US 2009/0255271 A1    Oct. 15, 2009

(30) Foreign Application Priority Data
Jun. 30, 2006    (FR) ..................................... 06 05912

(51) Int. Cl.
*F01D 25/30*    (2006.01)
*B64D 27/00*    (2006.01)

(52) U.S. Cl.
USPC .................................. 60/797; 60/796; 244/54

(58) Field of Classification Search
USPC ..................... 60/796, 797; 244/54; 248/554;
137/15.1, 15.2
See application file for complete search history.

(56) References Cited

U.S. PATENT DOCUMENTS 4,013,246 A * 3/1977 Nightingale .................... 244/54
4,266,741 A * 5/1981 Murphy .......................... 244/54

(Continued)

FOREIGN PATENT DOCUMENTS

| EP | 0145809 | 6/1985 |
| EP | 0155887 | 9/1985 |
| FR | 1095605 | 6/1955 |

(Continued)

OTHER PUBLICATIONS

International Search Report PCT/FR2007/000951; Dated Oct. 22, 2007.
ISR PCT FR2007 001678 dtd May 14, 2008.

*Primary Examiner* — William H Rodriguez
*Assistant Examiner* — Arun Goyal
(74) *Attorney, Agent, or Firm* — Brinks Gilson & Lione (57) ABSTRACT

The present invention relates, on the one hand, to a nacelle (1) for a double flow turboreactor (2) comprising a front air intake section (5), a median section (6) intended for surrounding a fan (3) of the turboreactor and a rear section (7), said rear section having an internal structure (7b) intended for serving as a housing to a rear portion of the turboreactor, characterized in that the internal structure possesses attachment means suitable for enabling the nacelle to be fastened to a pylon (12) intended to be connected to a fixed structure (13) of an aeroplane on at least one portion of said internal structure, and on the other hand, to a propellant assembly and to an aircraft provided with such a nacelle.

29 Claims, 8 Drawing Sheets

(56) References Cited

U.S. PATENT DOCUMENTS

| | | |
|---|---|---|
| 6,330,985 B1 | 12/2001 | Manteiga et al. |
| 7,740,200 B2 * | 6/2010 | Diochon et al. ............... 244/54 |
| 7,806,363 B2 * | 10/2010 | Udall et al. ............... 244/54 |
| 7,971,825 B2 * | 7/2011 | Diochon et al. ............... 244/54 |

FOREIGN PATENT DOCUMENTS

GB 2312251 10/1997

* cited by examiner

STRUCTURAL NACELLE

TECHNICAL FIELD OF THE INVENTION

The present invention relates to a nacelle for a turbofan.

BRIEF DISCUSSION OF RELATED ART

An aircraft is propelled by several turbojets each housed in a nacelle also accommodating an assembly of associated actuation devices linked to its operation, such as a thrust reverser device, and performing various functions when the turbojet is in operation or stopped.

A nacelle usually has a tubular structure comprising an air intake upstream of the turbojet, a mid-section designed to surround a fan of the turbojet, a downstream section accommodating thrust reverser means and designed to surround the combustion chamber of the turbojet, and is usually terminated by an exhaust nozzle whose outlet is situated downstream of the turbojet.

Modern nacelles are designed to accommodate a turbofan capable of generating, by means of the air foils of the fan in rotation, a flow of hot air (also called the main flow) originating from the combustion chamber of the turbojet, and a flow of cold air (the bypass flow) which travels on the outside of the turbojet through an annular passageway, also called a stream, formed between a fairing of the turbojet (or an internal structure of the downstream structure of the nacelle and surrounding the turbojet) and an internal wall of the nacelle. The two air flows are exhausted from the turbojet through the rear of the nacelle.

Each propulsion system of the aircraft is therefore formed by a nacelle and a turbojet, and is suspended on a fixed structure of the aircraft, for example beneath a wing or on the fuselage, by means of a pylon attached to the turbojet in its front and rear portions by suspension elements.

In such a configuration, it is the turbojet that supports the nacelle.

Such an architecture sustains many combined external forces during the aircraft's mission.

Amongst other things these are forces resulting from gravity, external and internal aerodynamic forces, gusts of wind, and thermal effects.

These stresses applied to the propulsion system are transmitted to the turbojet and cause deformations of casings which directly impact the performance of the various stages of the turbojet. More particularly, in the case of a propulsion system called a wasp-waisted propulsion system, that is to say having a long downstream portion that is relatively thin relative to the intermediate and air intake structures, these stresses result in a particularly harmful deformation called a "banana-shaping" deformation, the downstream portion curving considerably.

Such a "banana-shaping" is reflected by a deformation of the external structure of the nacelle formed by the various successive casings while the drive shaft, the blades of the fan and the internal blades of the turbojet remain rectilinear. The result of this is that the heads of the blades of the shaft move closer to the internal periphery of the casings. The general performance of the turbojet is thereby reduced relative to a configuration in which the casings sustain little or no deformations, because it is then necessary to take account of this deformation in the design of the nacelle so as always to arrange a sufficient clearance between the heads of the blades and the periphery of the casings. This results in a portion of the supply air that is not compressed by the blades because it escapes through this considerable clearance.

BRIEF SUMMARY OF THE INVENTION

The invention alleviates the aforementioned disadvantages, and for this reason includes in a nacelle for a turbofan comprising a front air intake section, a mid-section designed to surround a fan of the turbojet and a rear section, said rear section having an internal structure designed to serve as a casing to a rear portion of the turbojet, characterized in that the internal structure has coupling means suitable for allowing an attachment of the nacelle to a pylon designed to be connected to a fixed structure of an aircraft on at least one portion of said internal structure.

Therefore, by allowing the pylon to be directly attached to a structure of the nacelle instead of attaching it directly to the turbojet, it is the nacelle which supports the turbojet. In this manner, the turbojet does not have to sustain and transmit the deformations of the nacelle and vice versa. As explained above, it is then possible to optimize the clearance existing between the fan blades and the blades inside the turbojet and their respective casings in order to improve the performance of the propulsion system.

Preferably, the internal structure is fitted with means for rigid connection to the turbojet, for example by bolting.

Advantageously, the internal structure is connected to the mid-section by means of a casing surrounding the fan.

Preferably, the internal structure is connected to the mid-section of the downstream portion of the casing surrounding the fan on at least a portion of its periphery by means of a groove of the latter.

Again preferably, the internal structure is connected to the mid-section of the downstream portion of the casing over the whole of its periphery. Evidently, this attachment may be made only on a portion of the periphery of the groove.

Advantageously, the peripheral groove of the casing has a V-shaped internal profile.

Again advantageously, the internal structure is fitted with a means for recentering the turbojet.

Preferably, the internal structure is designed so that the pylon can extend over the whole length of the internal structure.

Advantageously, the pylon is incorporated into the internal structure.

Preferably, the internal structure comprises at least one external wall forming an aerodynamic surface mounted on a framework. Advantageously, the external wall is partially or totally made from at least one acoustic panel. In this manner, the external wall fulfills no structural role, this function being performed by the framework, and it can therefore be lightened to the maximum without it being necessary to provide high-density structural zones in this wall. In the case of an acoustic panel, it is therefore possible to dedicate the whole surface of the acoustic panel to the acoustic function without it being necessary to provide structural zones which prevent any acoustic function.

According to a first variant embodiment, the framework only partially surrounds the turbojet, preferably over at least 180°.

According to a second variant embodiment, the framework totally surrounds the turbojet.

Advantageously, the framework of the internal structure is made from radial frames. Again advantageously, the radial frames are made from force-absorbing link rods.

Preferably, at least a portion of the radial frames are made in a single piece.

In an alternative or complementary manner, at least a portion of the radial frames are made from several elements linked together, for example by bolting.

Advantageously, the framework of the internal structure is made from radial frames distributed over the length of the internal structure.

Preferably, the framework comprises at least one front radial frame and one rear radial frame connected by an intermediate structure forming a mesh.

Advantageously, the intermediate structure is made in the form of a caisson.

Advantageously, the intermediate structure is made from link bars connecting at least two radial frames together.

Again advantageously, at least a portion of the link bars are incorporated into at least one radial frame.

Preferably, the link bars are hollow.

Advantageously, the link bars are placed relative to one another so as to form triangles, preferably isosceles triangles.

In a yet more advantageous manner, the framework comprises at least one longitudinal reinforcement on either side of a longitudinal axis of the internal structure.

Preferably, the internal structure comprises at least one link rod for absorbing thrust attached, on the one hand, to at least one point of an upstream portion of the internal structure, for example at a horizontal mid-plane, and, on the other hand, at at least one point of a downstream portion of the internal structure in the vicinity of the pylon or optionally incorporated into the latter.

The presence of such thrust-absorbing link rods mounted obliquely makes it easier to transmit longitudinal forces to the pylon.

Advantageously, the link rod for absorbing thrust is oriented substantially in the structural alignment of the pylon.

Again advantageously, the link rod for absorbing thrust has a fork attached to the internal structure at at least two points of the upstream portion of the structure, on either side of the horizontal mid-plane, the fork of the link rod having a junction point situated, for example, at a radial frame of the framework.

Preferably, at least one portion of the framework elements, namely in particular the radial frames, force-absorbing link rods, intermediate structure and longitudinal reinforcements, are fitted with a heat protection.

According to a first variant embodiment, the framework is made in one piece.

According to a second variant embodiment, the framework is made in two half-pieces designed to be assembled substantially vertically.

The present invention also relates to an aircraft, characterized in that it comprises at least one propulsion system comprising a nacelle according to the invention.

BRIEF DESCRIPTION OF THE DRAWINGS

The implementation of the invention will be better understood with the aid of the detailed description that is explained below with reference to the appended drawing in which.

DETAILED DESCRIPTION OF THE INVENTION

Figure 1:
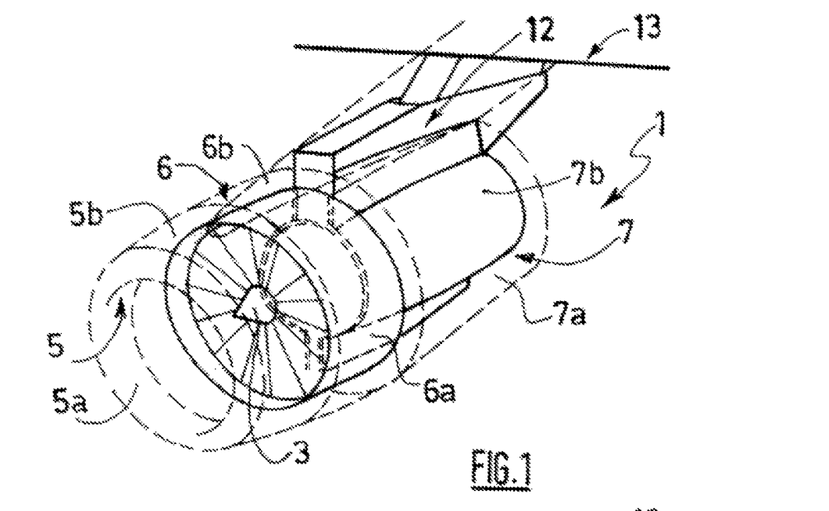
FIG. 1 is a schematic representation in perspective of a nacelle according to the invention attached to a pylon by means of an internal structure surrounding the turbojet.
Figure 2:
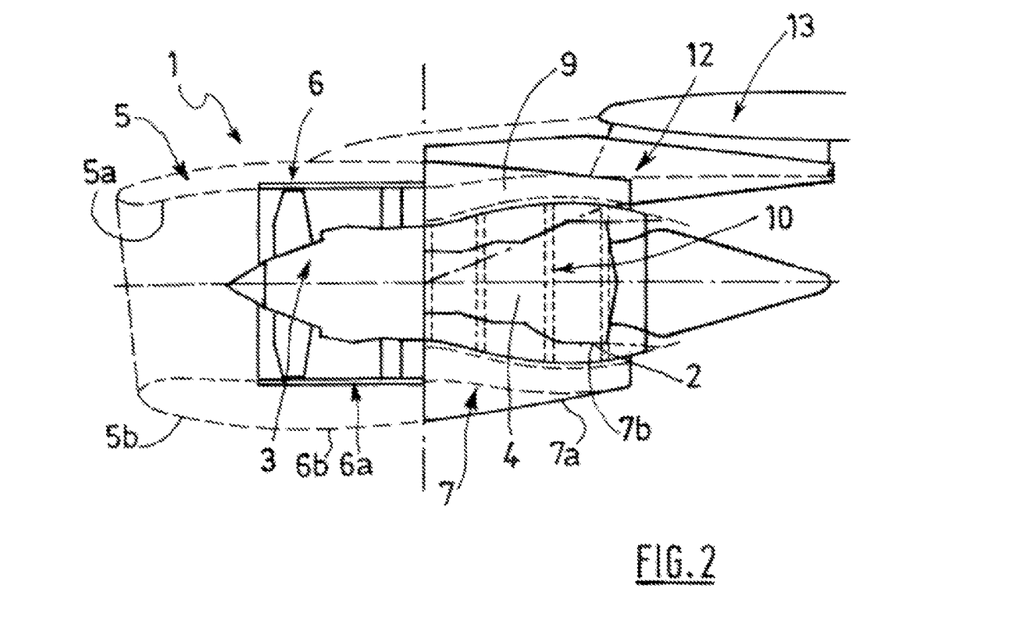
FIG. 2 is a view in longitudinal section of the nacelle of FIG. 1.

FIGS. 1 and 2 represent a nacelle 1 for a turbofan 2.

The nacelle 1 forms a tubular housing for a turbofan 2 and is used to channel the air flows that it generates by means of the air foils of a fan 3, namely a hot air flow passing through a combustion chamber 4 of the turbojet 2 and a cold air flow traveling outside the turbojet 2.

The nacelle 1 has a structure comprising a front section forming an air intake 5, a mid-section 6 surrounding the fan 3 of the turbojet 2, and a rear section 7 surrounding the turbojet 2 and comprising a thrust reverser system.

The air intake 5 has an internal surface 5a designed to channel the intake air and a fairing external surface 5b.

The mid-section 6 comprises, on the one hand, an internal casing 6a surrounding the fan 3 of the turbojet 2, and, on the other hand, a fairing external structure 6b of the casing extending the external surface 5b of the air intake section 5. The casing 6a is attached to the air intake section 5 which it supports and extends its internal surface 5a. In addition, the casing 6a is connected to an upstream casing 6c of the turbojet 2 by means of radial struts 8 placed crosswise. Quite evidently there could be more than four radial struts, particularly on a turbojet of the CFM type.

The rear section 7 comprises an external structure 7a comprising a thrust reverser system forming an exhaust nozzle and a fairing internal structure 7b of the turbojet 2 defining with the external structure 7a a stream 9 designed for the circulation of the cold flow.

The internal structure 7b is made of a structural framework 10 covered with acoustic panels 11 producing an internal aerodynamic surface of the stream 9. Accordingly, the acoustic panels 11 are not structural and may be lightened to the maximum, the whole surface of said acoustic panels 11 being able to be dedicated to the acoustic function without needing to provide structural zones preventing any acoustic element.

The structural framework 10 is designed to be attached directly to a mast 12 itself designed to be attached to a fixed portion of an aircraft such as a wing 13.

Figure 3:
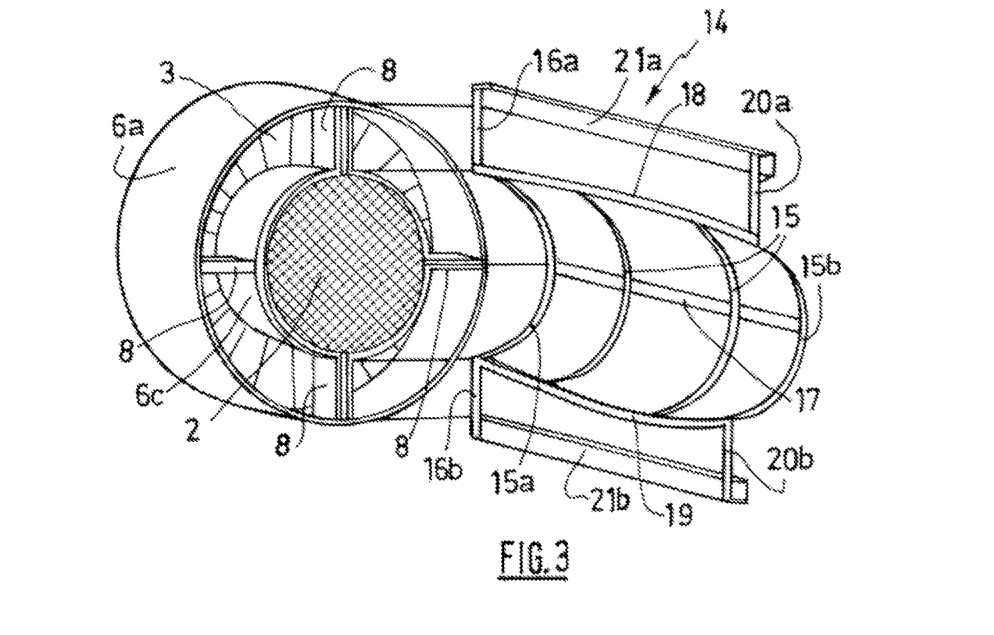
FIG. 3 is a partial schematic view showing the arrangement of the internal structure relative to a casing of the fan.

The structural framework 10 is made from two half-portions 14, one of which is represented in FIG. 3 in perspective with the casing 6a of the fan 3, designed to be attached together.

Each half-portion 14 has a series of radial frames 15 that are distributed over the whole length of the half-portion 14 and whose number and section are defined according to the forces to be made to pass through.

More precisely, each half-portion has an upstream radial frame 15a associated with a top strut 16a and a bottom strut 16b which, together with the upstream radial frame 15a, are designed to serve as a connection interface between the structural framework 10 and the mid-section 6 by means of the upstream casing 6c and the vertical struts 8.

The radial frames 15 are connected together by at least one longitudinal reinforcement 17 and by a top longitudinal reinforcement 18 and a joining bottom longitudinal reinforcement 19. Furthermore, the half-portion 14 has a downstream top strut 20a and a downstream bottom strut 20b which supplement the half-portion 14 in order to allow a structural connection by a top reinforcement 21a and a bottom reinforcement 21b respectively connecting the struts 16a and 20a and 16b and 20b together. Other top and bottom struts may be added, for example in continuity with the radial frames 15.

Figure 4:
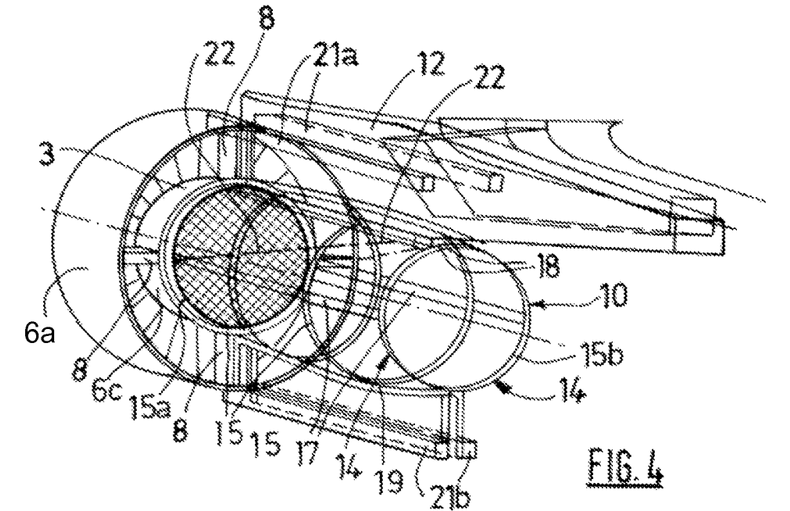
FIG. 4 is a schematic representation of the structure of FIG. 3 with a complete internal structure attached to the pylon.

The transmission of the forces is improved by adding to each half-portion 14 a force-absorbing link rod 22, as can be seen in FIG. 4, attached, on the one hand, upstream of the half-portion 14 at a mid-plane of the structural framework 10, that is to say substantially at the longitudinal reinforcement 17 and the upstream radial frame 15a, and, on the other hand, downstream of the half-portion 14 at a point designed to come close to the mast 12, that is to say substantially on the top longitudinal reinforcement 18 and close to a downstream radial frame 15b. Advantageously, the force-absorbing link rod 22 is therefore oriented in a direction that is substantially identical to the direction of the mast 12. Alternatively, the downstream coupling point of the force-absorbing link rod 22 may be incorporated into the mast 12.

Each half-portion 14 is connected to the other half-portion via its bottom portion, by means of their upstream bottom struts 16b and downstream bottom struts 20b, and by means of the bottom longitudinal reinforcements 19 and bottom reinforcements 21b.

In the top portion, each half-portion 14 is connected to the mast 12 by means of their upstream top struts 16a and downstream top struts 20a, and by means of the top longitudinal reinforcements 18 and top reinforcements 21a.

Alternatively, the mast may be incorporated into the structural framework 10.

Figure 5:
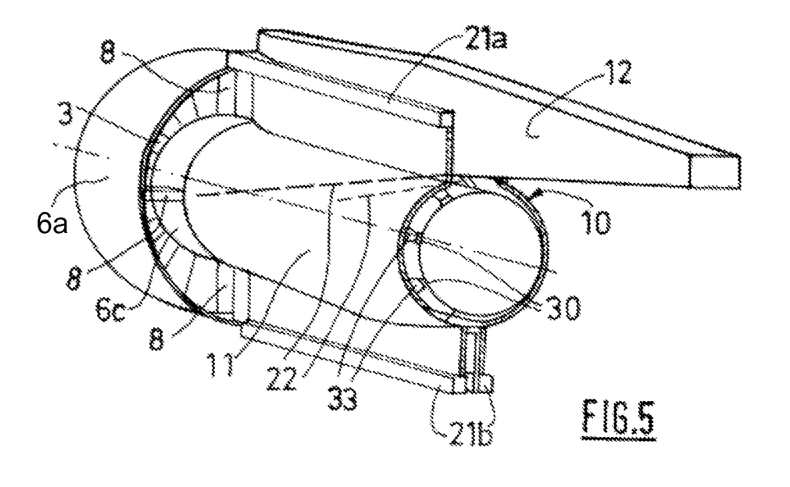
FIG. 5 is a representation in solid lines of FIG. 4 with the internal structure accommodating the turbojet.

FIG. 5 represents the inside of the nacelle 1, once the structural framework 10 has been covered by the acoustic panels 11.

Figure 6:
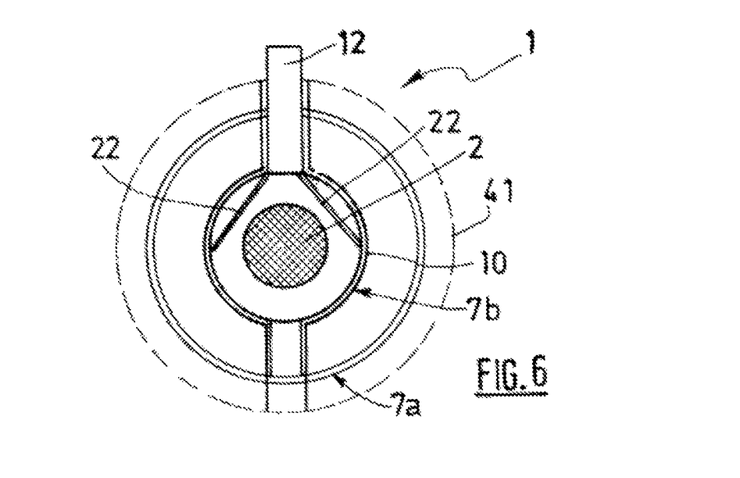
FIG. 6 is a view in cross section of the nacelle of FIG. 1.

FIG. 6 shows a front view in section of the internal structure 7b thus assembled.

Figure 7:
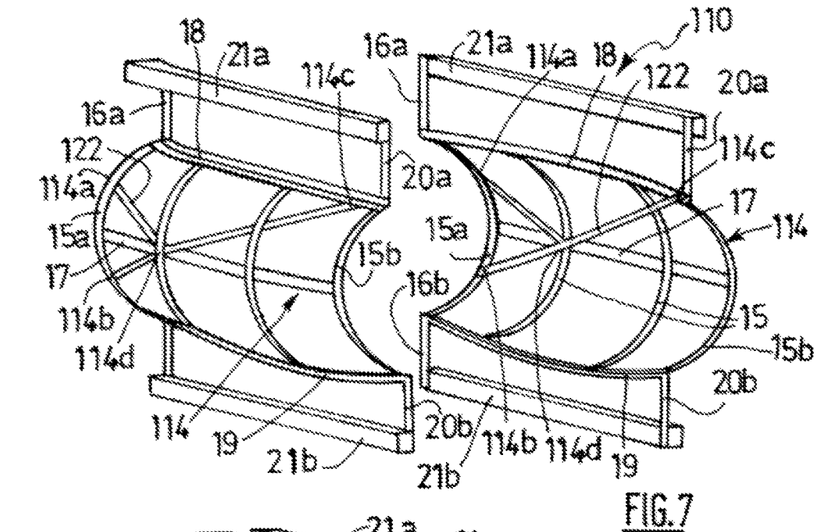
FIG. 7 is a schematic representation of a first variant embodiment of the internal structure.

FIG. 7 shows a variant embodiment of the structural framework 10. A structural framework 110 according to FIG. 7 is made from two half-portions 114 that differ only from a half-portion 14 by the fact that each half-portion 114 comprises a force-absorbing link rod 122 having an upstream fork. Such a force-absorbing link rod 122 is therefore attached to the half-portion 114 at three points, namely two downstream points 114a, 114b situated at the upstream radial frame 15a on either side of the mid-plane of the structural framework 110, that is to say on either side of the longitudinal reinforcement 17, and at a point 114c situated downstream at the same location as for the force-absorbing link rod 22. Preferably, the fork of the force-absorbing link rod 122 joins at a point 114d substantially situated at a radial frame 15 and is attached thereto.

Figure 8:
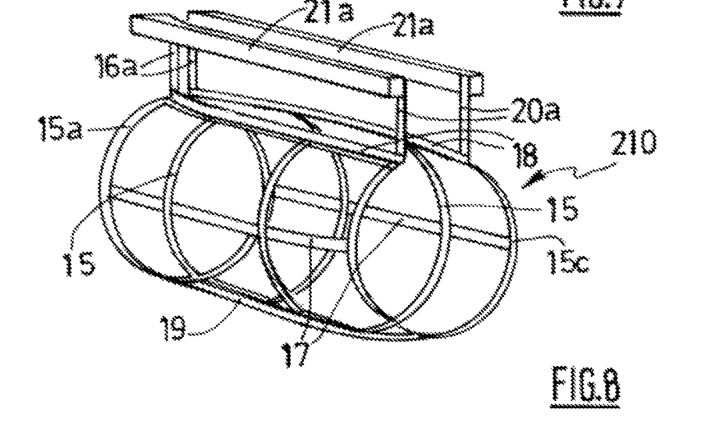
FIG. 8 is a schematic representation of a second variant embodiment of the internal structure.

FIG. 8 shows a structural framework 210 made in a single piece that is open at the top portion only, the portion by which it is designed to be attached to the mast 12.

Figure 9:
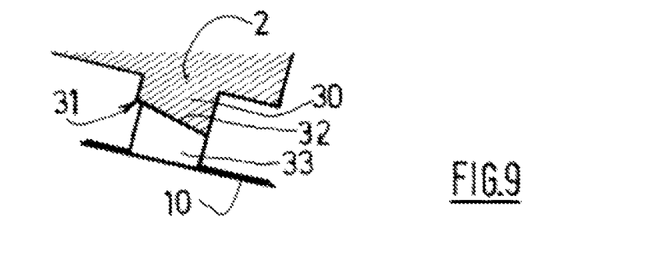
FIG. 9 is a simplified illustration of a recentering means fitted to the internal structure.

The structural framework 10, 110, 210 is supplemented by means for recentering between the turbojet 2 and the internal structure 7b situated downstream of the latter. The operating principle of the recentering means is shown in FIG. 9.

The recentering means provides a permanent contact between the turbojet 2 and the internal structure 7b so as to take account of a differential movement between these two structures due to the thermal expansion of the turbojet 2 in operation causing a longitudinal and axial movement of the latter.

To do this, the turbojet has, downstream of its structure, radial extensions 30 distributed over the whole of its circumference and each terminated by a ramp 31 in sliding contact with a complementary ramp 32 of an internal radial extension 33 of the structural framework 10, 110, 210. The ramps 31, 32 are designed so that their orientation corresponds substantially to the estimated movement differential between the two structures.

The recentering system may be made in various ways, notably by elastic contact, by distinct or one-piece elements, on only one sector of the periphery of the turbojet 2 or on the whole of its periphery.

Figure 10:
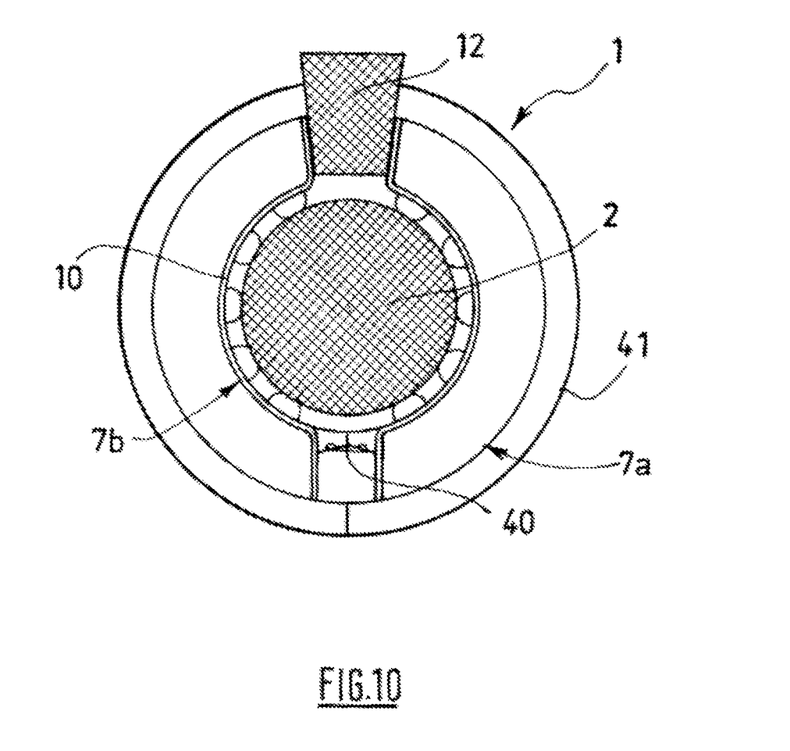
FIG. 10 is a view in cross section of a nacelle according to the invention with an internal structure fitted with means for recentering the turbojet.

FIG. 10 shows a front view in section showing a distribution of the recentering means.

It will also be noted that the invention allows easier maintenance of the turbojet 2, the access to the latter being able to be made simply by removing the acoustic panels 11 without the need to dismantle the whole internal structure 7b.

It will also be noted that the internal structure 7b may optionally comprise a bottom structure allowing the coupling of a rear external structure 41 in the bottom portion. In this case, the result is a distance between the point of attachment of said rear external structure 41 and the downstream circumferential recentering zone of the turbojet 2. This distance provides a force component which tends to separate the bottom structure from the internal structure 7b by which the rear external structure 41 is attached which no longer allows the recentering means to fulfill their function in this zone. Accordingly, it will be possible to ensure the integrity of the maintenance of the recentering by a system of locks 40 at the junction between the two half-portions 14, 114 at the downstream radial frames 15b.

FIGS. 11 to 14 show a particular variant embodiment of the invention comprising a short internal structure 310 also maintained at a casing of the fan.

Figures 11, 12:
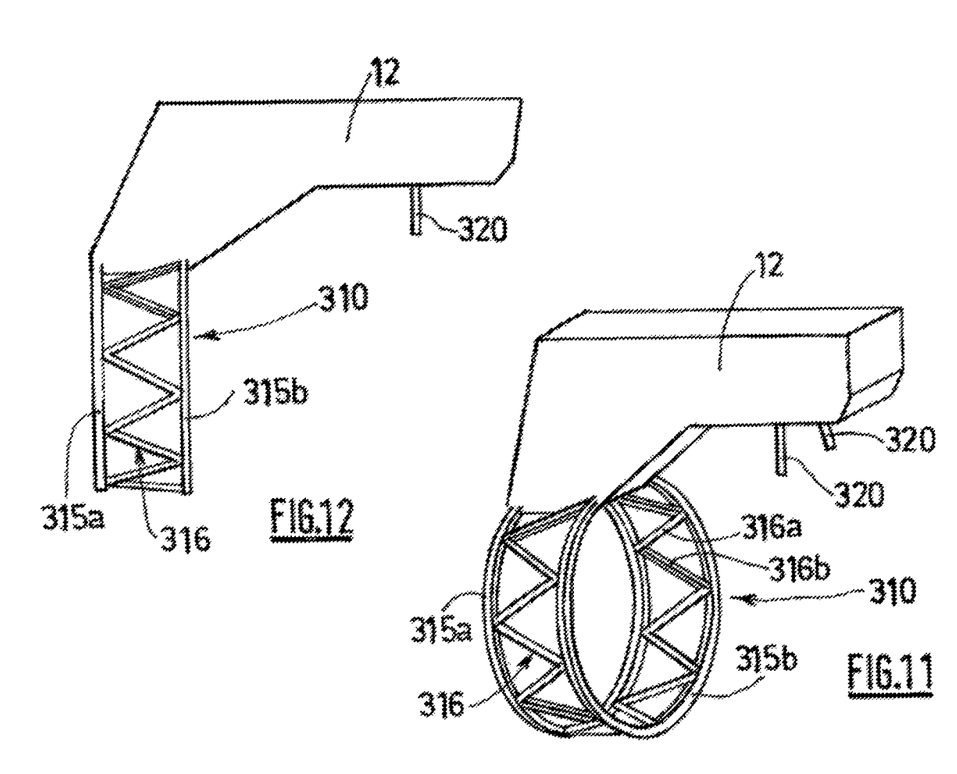
FIGS. 11 and 12 are representations respectively in perspective and from the side of a third embodiment comprising a short internal structure.

The support system alone is shown in FIGS. 11 and 12.

The latter comprises attachment means of the pylon 12 type to which the internal structure 310 is connected.

The internal structure 310 is shown in the form of a peripheral structural framework made from a front peripheral radial frame 315a and a rear peripheral radial frame 315b.

The front radial frame 315a and the rear radial frame 315b are connected together by an intermediate structure 316 forming a mesh made from link bars 316a, 316b together forming substantially isosceles triangles.

The support assembly is supplemented by suspension elements 320 mounted on the structure of the pylon 12 type and designed to be connected close to one end of the turbojet 2.

Figure 13:
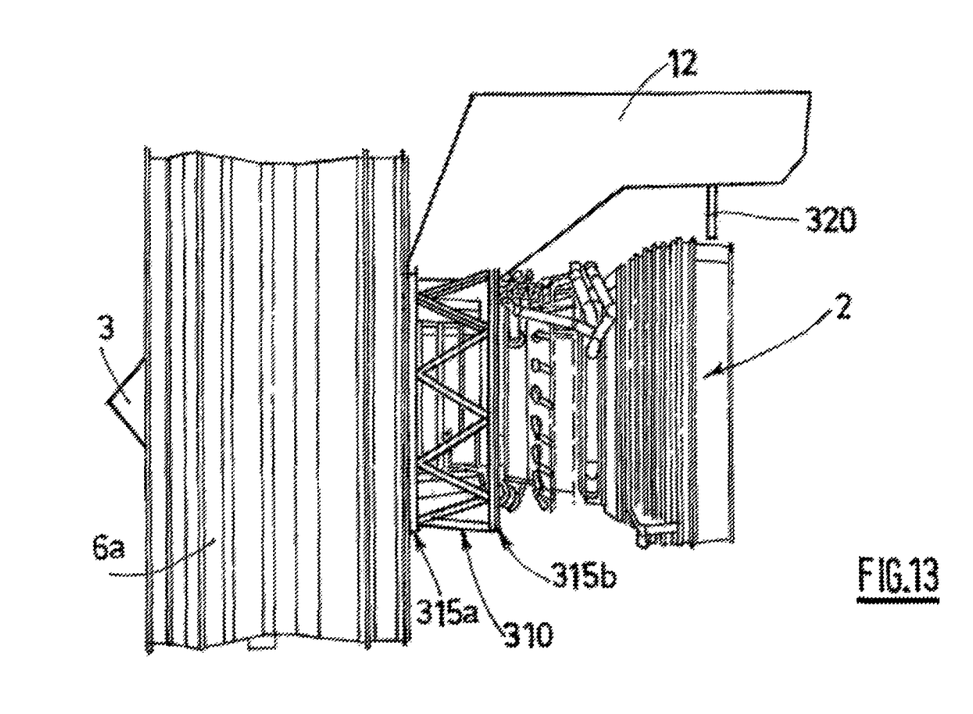
FIGS. 13 and 14 are representations of the structure represented in FIGS. 11 and 12 in a turbojet-supporting situation.
Figure 14:
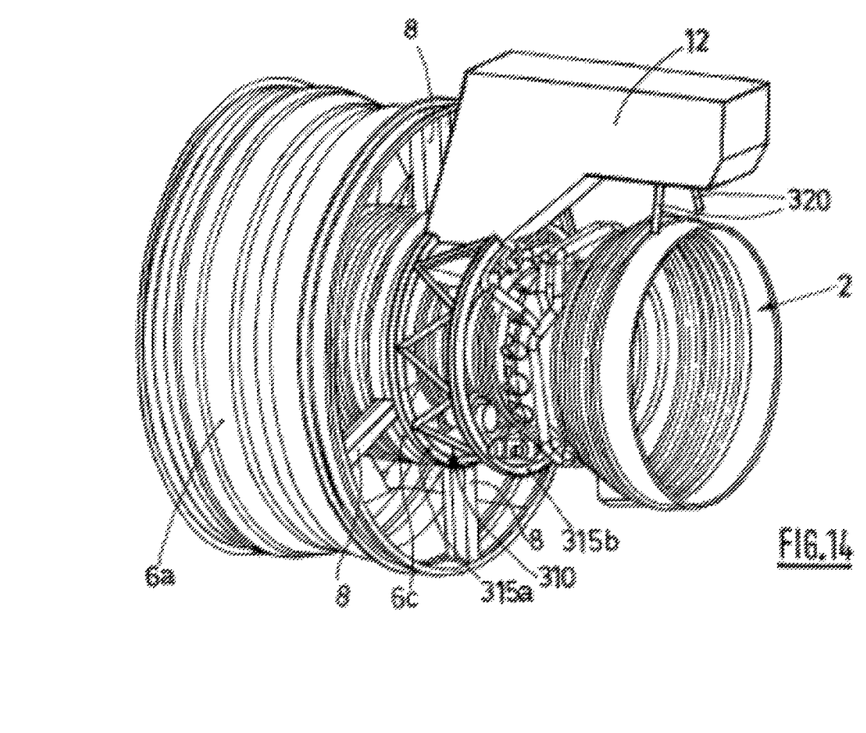

FIGS. 13 and 14 show the support assembly previously described in a situation of support of a turbojet 2, the framework 310 being connected to the casing 6c by means of a bolting system via the front radial frame 315a installed in a V-shaped peripheral groove of the casing 6c.

Evidently, as mentioned above, the internal structure may, as a variant, be made in the form of one or more sectors that are not entirely peripheral.

Although the invention has been described with particular exemplary embodiments, it is evident that it is in no way limited thereto and that it comprises all the technical equivalents of the means described and their combinations if the latter enter into the context of the invention.

The invention claimed is:

1. A nacelle for a turbofan comprising
a front air intake section,
a mid-section designed to surround a fan of a turbojet and
a rear section, said rear section having an internal structure designed to serve as a casing to rear portion of the turbojet and an external structure,
wherein the internal structure has coupling means suitable for allowing an attachment of the nacelle to a pylon designed to be connected to a fixed structure of an aircraft on at least one portion of said internal structure,
wherein the internal structure comprises at least one external wall forming an aerodynamic surface adjacent a cold flow stream that flows between the internal structure and the external structure, the external wall mounted over a framework made from plurality of radial frames distributed over the length of the internal structure and each radial frame comprising a circumferential ring,
wherein each adjacent circumferential ring is connected together by at least one reinforcement between them.

2. The nacelle as claimed in claim 1, wherein the internal structure is fitted with means for rigid connection to the turbojet.

3. The nacelle as claimed in claim 1, wherein the internal structure is connected to the mid-section by means of a casing surrounding the fan.

4. The nacelle as claimed in claim 3, wherein the internal structure is connected to the mid-section of the downstream portion of the casing surrounding the fan on at least a portion of its periphery.

5. The nacelle as claimed in claim 4, wherein the internal structure is connected to the mid-section of the downstream portion of the casing over the whole of its periphery.

6. The nacelle as claimed in claim 4, wherein the peripheral groove of the casing has a V-shaped internal profile.

7. The nacelle as claimed in claim 6, wherein the framework comprises at least one longitudinal reinforcement on either side of a longitudinal axis of the internal structure.

8. The nacelle as claimed in claim 1, wherein the internal structure is fitted with a means for recentering the turbojet.

9. The nacelle as claimed in claim 1, wherein the internal structure is designed so that the pylon can extend over the whole length of the internal structure.

10. The nacelle as claimed in claim 1, wherein the pylon is incorporated into the internal structure.

11. The nacelle as claimed in claim 1, wherein the framework totally surrounds the turbojet.

12. The nacelle as claimed in claim 1, wherein the external wall is partially or totally made from at least one acoustic panel.

13. The nacelle as claimed in claim 1, wherein the radial frames are made from force-absorbing link rods.

14. The nacelle as claimed in claim 1, wherein at least a portion of the radial frames are made in a single piece.

15. The nacelle as claimed in claim 1, wherein at least a portion of the radial frames are made from several elements linked together, for example by bolting.

16. The nacelle as claimed claim 1, wherein the framework comprises at least one front radial frame and one rear radial frame connected by an intermediate structure forming a mesh.

17. The nacelle as claimed in claim 16, wherein the intermediate structure is made in the form of a caisson.

18. The nacelle as claimed in claim 16, wherein the intermediate structure is made from link bars connecting at least two radial frames together.

19. The nacelle as claimed in claim 18, wherein at least a portion of the link bars are incorporated into at least one radial frame.

20. The nacelle as claimed in claim 18, wherein the link bars are hollow.

21. The nacelle as claimed in claim 18, wherein the link bars are placed relative to one another so as to form triangles, preferably isosceles triangles.

22. The nacelle as claimed in claim 1, wherein the internal structure comprises at least one link rod for absorbing thrust attached to at least one point of an upstream portion of the internal structure and at least one point of a downstream portion of the internal structure in the vicinity of the pylon or optionally incorporated into the latter.

23. The nacelle as claimed in claim 22, wherein the link rod for absorbing thrust is oriented substantially in the structural alignment of the pylon.

24. The nacelle as claimed in claim 22, wherein the link rod for absorbing thrust has a fork attached to the internal structure at at least two points of the upstream portion of the internal structure, on either side of the horizontal mid-plane, the fork of the link rod having a junction point situated at a radial frame of the framework.

25. The nacelle as claimed in claim 1, wherein at least one portion of the framework elements comprising at least one of the radial frames, force-absorbing link rods, intermediate structure and longitudinal reinforcements, are fitted with a heat protection.

26. The nacelle as claimed in claim 1, wherein the internal structure has a one-piece framework.

27. The nacelle as claimed in claim 1, wherein the internal structure has a two-piece framework designed to be assembled substantially vertically.

28. A propulsion system, comprising a nacelle as claimed in claim 1, said nacelle accommodating a turbo-jet.

29. An aircraft, comprising at least one propulsion system as claimed in claim 28.

* * * * *